(12) United States Patent
Lee et al.

(10) Patent No.: US 9,559,965 B2
(45) Date of Patent: Jan. 31, 2017

(54) REAL-TIME TRAFFIC MANAGEMENT FOR MACHINE TO MACHINE COMMUNICATIONS

(71) Applicant: Verizon Patent and Licensing Inc., Basking Ridge, NJ (US)

(72) Inventors: Jay J. Lee, San Ramon, CA (US); Gerard J. Flynn, Washington, NJ (US); Taher Farkhondeh, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 699 days.

(21) Appl. No.: 13/971,259

(22) Filed: Aug. 20, 2013

(65) Prior Publication Data
US 2015/0055469 A1 Feb. 26, 2015

(51) Int. Cl.
*H04L 12/801* (2013.01)
(52) U.S. Cl.
CPC .................................. *H04L 47/127* (2013.01)

(58) Field of Classification Search
None
See application file for complete search history.

(56) References Cited

U.S. PATENT DOCUMENTS

| | | | |
|---|---|---|---|
| 2004/0057445 A1* | 3/2004 | LeBlanc | H04J 3/0632 370/412 |
| 2014/0341109 A1* | 11/2014 | Cartmell | H04L 45/308 370/328 |

\* cited by examiner

*Primary Examiner* — Adnan Baig

(57) ABSTRACT

A device may receive machine-to-machine (M2M) traffic associated with an M2M application. The device may determine parameters associated with managing the M2M traffic. The parameters may include information identifying a time window. The device may determine a weighted average traffic rate associated with the M2M traffic based on the parameters. The device may determine a holding time to be applied to the M2M traffic based on the weighted average traffic rate and the parameters. The device may determine an outgoing traffic rate to be applied to the M2M traffic based on the weighted average traffic rate and the parameters. The device may manage the M2M traffic based on the holding time and the outgoing traffic rate.

20 Claims, 8 Drawing Sheets

100 ⟶

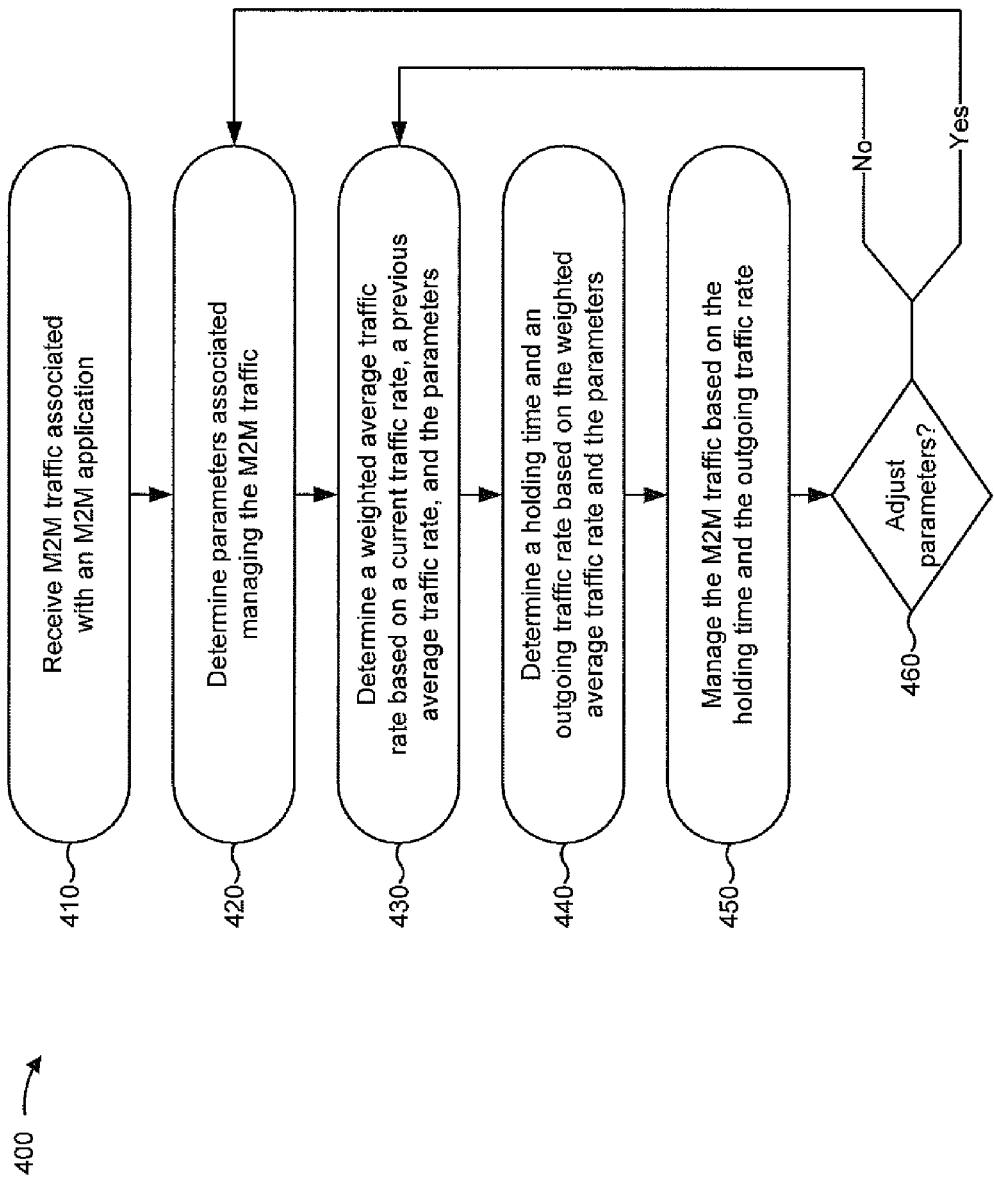

REAL-TIME TRAFFIC MANAGEMENT FOR MACHINE TO MACHINE COMMUNICATIONS

BACKGROUND

Machine-to-machine (M2M) communication is characterized by a large number of machines sharing information and making collaborative decisions without direct human interaction. As such, M2M communication may be a market changing force for a variety of real-time monitoring applications, such as healthcare, smart homes, environmental monitoring, industrial automation, and others.

BRIEF DESCRIPTION OF THE DRAWINGS

FIG. 4 is a flow chart of an example process for managing machine-to-machine traffic based on determining a holding time and an outgoing traffic rate.

DETAILED DESCRIPTION OF PREFERRED EMBODIMENTS

The following detailed description of example implementations refers to the accompanying drawings. The same reference numbers in different drawings may identify the same or similar elements.

M2M communication may allow a variety of applications (e.g., healthcare, smart homes, environmental monitoring, industrial automation, etc.) to function effectively. However, M2M traffic, associated with M2M communication, is typically characterized by an infrequent, small burst transmission from a large number of M2M devices. As such, the level of M2M traffic may be random, unpredictable, and/or highly varied during any given period of time.

As a result of these characteristics, M2M traffic may provide challenges to a network that handles the M2M traffic. For example, a network may be over-dimensioned and/or under-dimensioned due to unpredictable traffic flows (e.g., where a predictable and/or steady traffic flow would allow for efficient network dimensioning). As such, a predictable and/or steady rate of M2M traffic may allow the network to be properly dimensioned, and may allow network resources to be used efficiently. Implementations described herein may allow M2M traffic to be managed, in real-time, in a way that may result in the M2M traffic using network resources in a steady and/or predictable manner.

Figure 1:
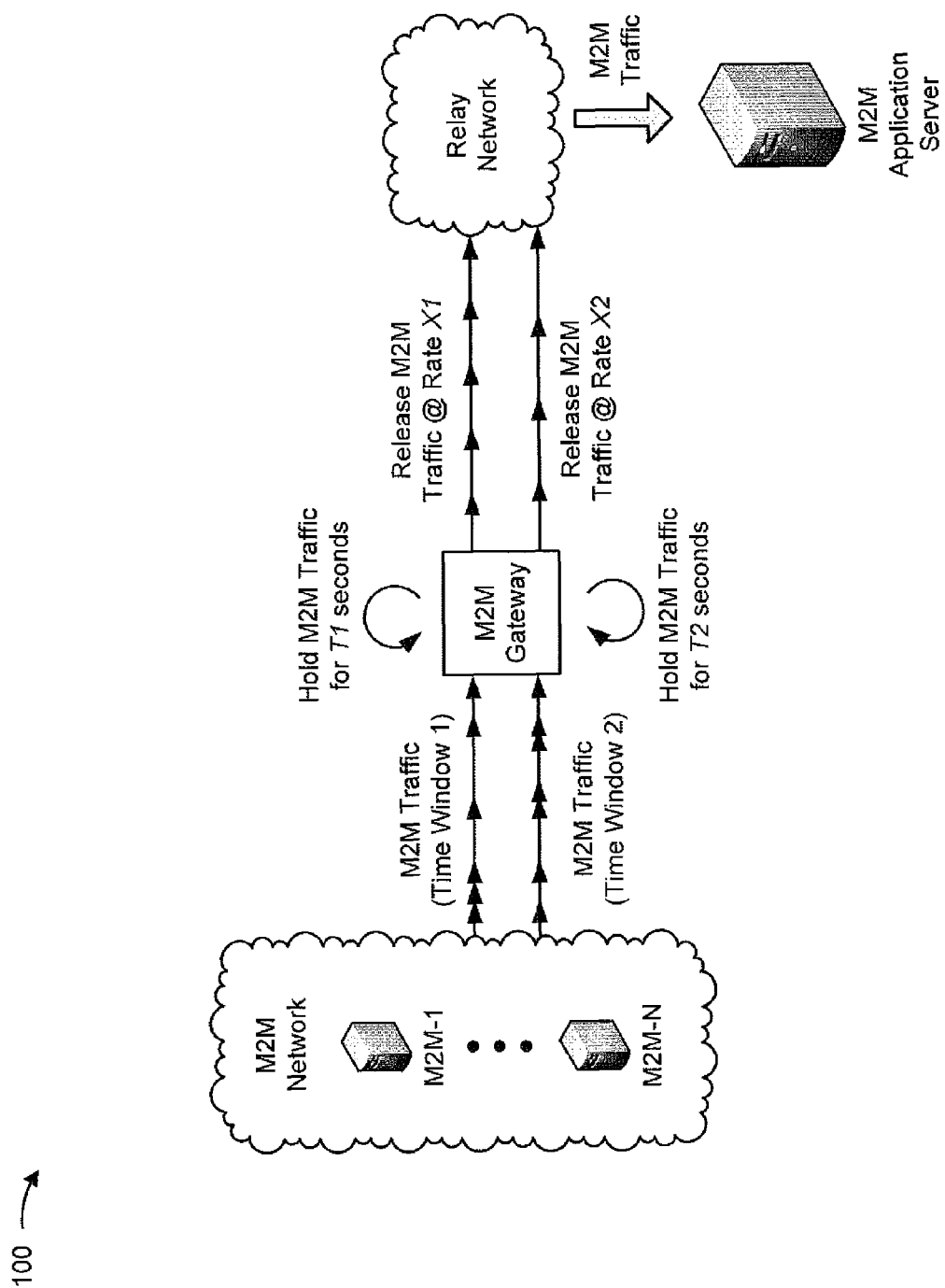
FIG. 1 is a diagram of an overview of an example implementation described herein.

FIG. 1 is a diagram of an overview of an example implementation 100 described herein. For the purposes of FIG. 1, assume that an M2M network includes a quantity of N (e.g., N>1) M2M devices. Further, assume that the M2M traffic, associated with the M2M devices, is to be provided to an M2M application server via an M2M gateway and a relay network.

As shown in FIG. 1, the M2M devices may send M2M traffic to the M2M gateway during a first time window (e.g., a first period of time). As shown, the M2M traffic may be sent by the M2M devices (e.g., via the M2M network) in an unpredictable manner during the first time window (e.g., one or more M2M devices may send one or more bursts of M2M traffic with short peak rates at unpredictable times). As shown, the M2M gateway may receive the M2M traffic during the first time window, and may determine a holding period of T1 seconds for the M2M traffic received during the first time window (e.g., the M2M gateway may not forward the M2M traffic until the end of the holding period). As further shown, M2M gateway may also determine that the M2M traffic, received during the first time window, is to be released at a steady rate of X1 units per second (e.g., after T1 seconds have elapsed from the end of the first time window). As shown, the M2M gateway may hold the M2M traffic, received during the first time window, for T1 seconds, and may release the traffic to the relay network at a steady rate of X1 units per second. The relay network may process the M2M traffic, and may forward the traffic to the M2M application server.

As further shown in FIG. 1, the M2M devices may send M2M traffic to the M2M gateway during a second time window (e.g., a second time window immediately following the first time window). As shown, the M2M traffic may also be received, by the M2M gateway, in an unpredictable manner during the second time window. As shown, the M2M gateway may determine a holding period of T2 seconds for the M2M traffic received during the second time window. As further shown, M2M gateway may also determine that the M2M traffic, received during the second time window, is to be released at a steady rate of X2 units per second (e.g., after T2 seconds have elapsed from the end of the second time window). As shown, the M2M gateway may hold the M2M traffic, received during the second time window, for T2 seconds, and may then release the traffic to the relay network at a steady rate of X2 units per second. The relay network may process the M2M traffic, and may forward the traffic to the M2M application server. In this way, the M2M traffic flow may be managed by the M2M gateway such that the M2M traffic flows to a network, associated with handling the M2M traffic, in a predictable manner. This may allow network resources to be efficiently utilized, managed, and/or dimensioned.

Figure 2:
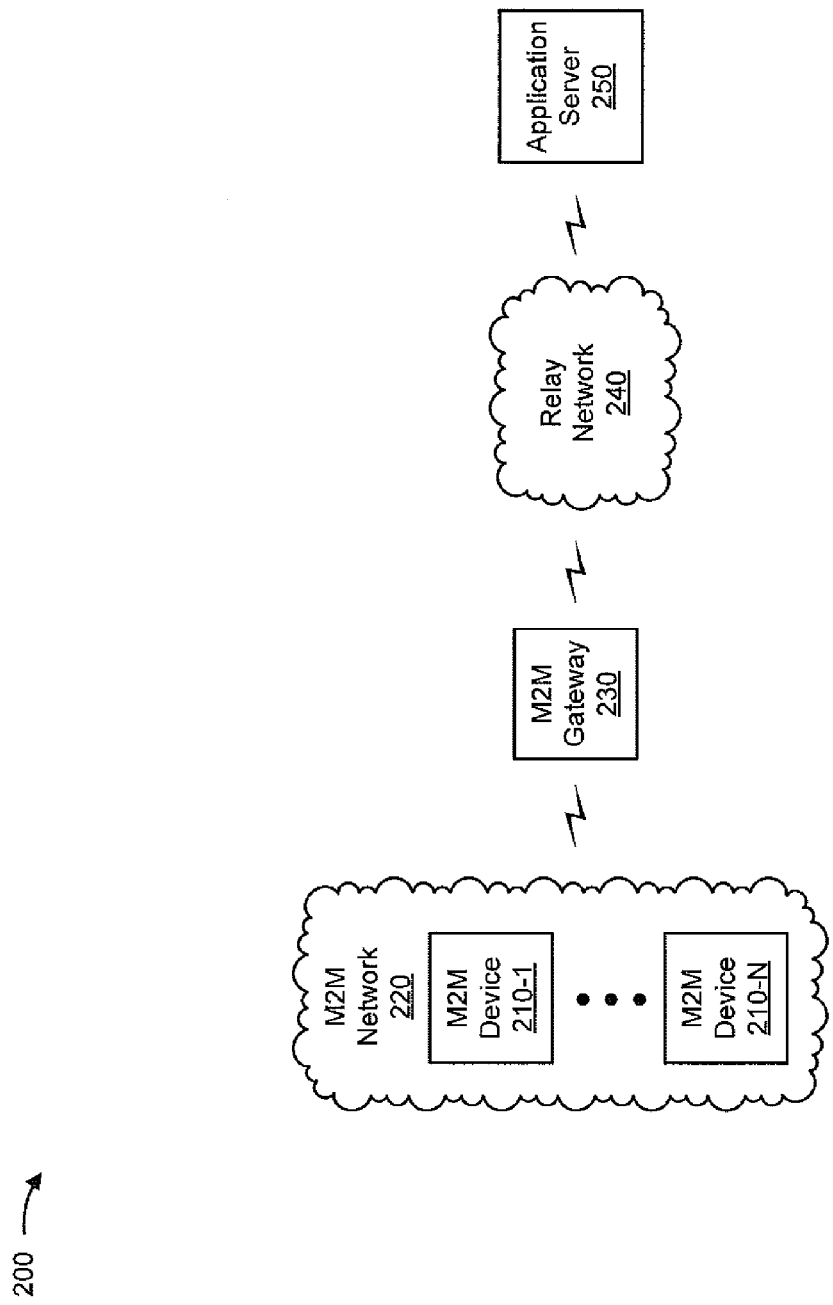
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a set of M2M devices 210-1 through 210-N (N>1) (hereinafter collectively referred to as "M2M devices 210," and individually as "M2M device 210"), M2M network 220, M2M gateway 230, relay network 240, and application server 250.

M2M device 210 may include a device associated with receiving, generating, storing, processing, and/or providing M2M data associated with an M2M application. For example, M2M device 210 may include a network device (e.g., a modem, a switch, a gateway, etc.), a sensing device, a processing device, a metering device, and/or some other type of device. For example, M2M device 210 may include a device capable of monitoring and/or sensing M2M data in real-time. In some implementations, M2M device 210 may transmit the M2M data to M2M network 220, M2M gateway 230, and/or relay network 240. In some implementations, one or more M2M devices 210 may be included in M2M network 220.

M2M network 220 may include one or more wired and/or wireless networks associated with an M2M application. For example, M2M network 220 may include a cellular network, a public land mobile network ("PLMN"), a local area network ("LAN"), a wireless local area network ("WLAN"

or "Wi-Fi network"), a wide area network ("WAN"), a metropolitan area network ("MAN"), an enterprise network, a telephone network, an ad hoc network, an intranet, the Internet, a fiber optic-based network, or a combination of these or other types of networks. In some implementations, M2M network 220 may include one or more M2M devices 210, and the one or more M2M devices 210 may communicate with M2M gateway 230 via M2M network 220. In some implementations, M2M network 220 may provide M2M traffic to M2M gateway 230 (e.g., traffic, associated with an M2M application, to be sent to application server 250). Additionally, or alternatively, M2M network 220 may send and/or receive M2M traffic via another M2M network 220 (e.g., another M2M network including another M2M device 210).

M2M gateway 230 may include a device capable of providing connectivity for M2M device 210 and/or M2M network 220 to relay network 240 and/or application server 250. For example, M2M gateway 230 may include one or more data processing and/or traffic transfer devices, such as a gateway, a router (e.g., an edge router, an access router, etc.), a modem, a switch, a firewall, a network interface card ("NIC"), a hub, a bridge, a server, an optical add/drop multiplexer ("OADM"), or any other type of device that processes and/or transfers traffic. In some implementations, M2M gateway 230 may include a device capable of sending and/or receiving M2M traffic, associated with M2M data, to and/or from M2M network 220 and/or relay network 240. Additionally, or alternatively, M2M gateway 230 may be capable of processing, handling, and/or managing M2M traffic based on a holding time and an outgoing traffic rate determined by M2M gateway 230 and/or another device. In some implementations, one or more M2M gateways 230 may be included in relay network 240 (e.g., at the edge of relay network 240, at the interior of relay network 240, etc.). In some implementations, M2M gateway 230 may send and/or receive M2M traffic to and/or from multiple M2M networks 220.

Relay network 240 may include one or more wired and/or wireless networks. For example, relay network 240 may include a cellular network (e.g., a long term evolution ("LTE") network), a PLMN, a LAN, a WLAN, a WAN, a MAN, an enterprise network, a telephone network, an ad hoc network, an intranet, the Internet, a fiber optic-based network, or a combination of these or other types of networks. In some implementations, M2M gateway 230 may be included in relay network 240. In some implementations, relay network 240 may include one or more M2M gateways 230 and/or one or more other devices associated with routing M2M traffic, associated with M2M network 220 and/or M2M device 210, to application server 250.

Application server 250 may include a device, such as a server, that hosts and/or provides an M2M application service. In some implementations, application server 250 may receive, generate, store, process, and/or provide M2M data, associated with M2M traffic, provided by M2M devices 210 (e.g., via M2M gateway 230 and/or relay network 240). In some implementations, application server 250 may provide the M2M data, in real-time, to another device associated with the M2M application.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
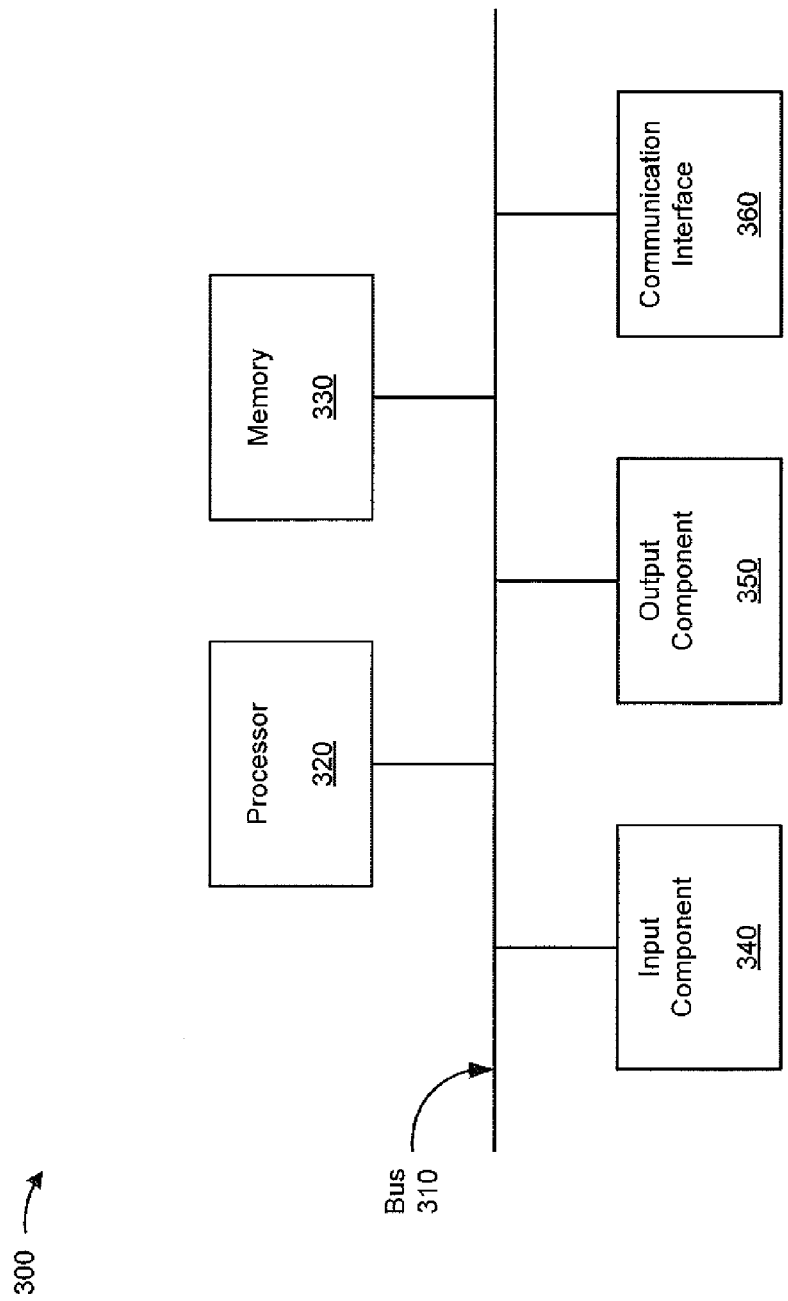
FIG. 3 is a diagram of example components of one or more devices of FIG. 2.

FIG. 3 is a diagram of example components of a device 300. Device 300 may correspond to M2M device 210, M2M gateway 230, and/or application server 250. Additionally, or alternatively, each of M2M device 210, M2M gateway 230, and/or application server 250 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

FIG. 4 is a flow chart of an example process 400 for managing machine-to-machine traffic based on determining a holding time and an outgoing traffic rate. In some implementations, one or more process blocks of FIG. 4 may be performed by M2M gateway 230. In some implementations, one or more process blocks of FIG. 4 may be performed by another device or a group of devices separate from or including M2M gateway, such as a device (e.g., a router, a gateway, a server, etc.) or a group of devices included in relay network 240.

As shown in FIG. 4, process 400 may include receiving M2M traffic associated with an M2M application (block 410). For example, M2M gateway 230 may receive M2M traffic, associated with an M2M application, via M2M network 220. In some implementations, M2M device 210 may receive M2M data (e.g., by monitoring and/or sensing the M2M data), and M2M device 210 may send the M2M traffic (e.g., including the M2M data) to M2M gateway 230. Additionally, or alternatively, M2M gateway 230 may receive the M2M traffic from another device included in M2M network 220.

M2M traffic may include traffic associated with an M2M application. For example, M2M device 210 may receive, generate, determine, process, and/or provide data, associated with the M2M application (e.g., an agriculture application, a utility application, etc.), and may send M2M traffic to M2M network 220 and/or M2M gateway 230. In some implementations the M2M traffic may be used by application server 250 to manage, operate, and/or provide the M2M application.

As further shown in FIG. 4, process 400 may include determining parameters associated with managing the M2M traffic (block 420). For example, M2M gateway 230 may determine parameters associated with managing the M2M traffic received from M2M device 210. In some implementations, M2M gateway 230 may determine the parameters when M2M gateway 230 receives the M2M traffic from M2M network 220 and/or M2M device 210. Additionally, or alternatively, M2M gateway 230 may determine the parameters when an outgoing traffic rate, determined by M2M gateway 230, satisfies a threshold (e.g., when an amount of traffic has changed such that adjusted parameters are required). Additionally, or alternatively, M2M gateway 230 may determine parameters when a holding time, determined by M2M gateway, satisfies a threshold. Additionally, or alternatively, M2M gateway 230 may determine the parameters when M2M gateway 230 receives a notification, from relay network 240, indicating that the parameters are to be adjusted.

In some implementations, M2M gateway 230 may determine the parameters based on information stored by M2M gateway 230. For example, M2M gateway 230 may store, in a memory location associated with M2M gateway 230, information identifying the parameters, and M2M gateway 230 may determine the parameters based on the stored information. Additionally, or alternatively, M2M gateway 230 may determine the parameters based on information received from relay network 240. For example, M2M gateway 230 may receive M2M traffic from M2M network 220, and may query a device associated with relay network 240 to determine the parameters. The device associated with relay network 240 may determine the parameters (e.g., based on information stored by a device included in relay network 240) and may provide the parameters to M2M gateway 230 (e.g., via relay network 240).

Parameters associated with managing the M2M traffic may include information (e.g., a numerical value) used to determine a holding time (e.g., a period of time that M2M gateway 230 may hold the M2M traffic before sending the M2M traffic to relay network 240) and/or an outgoing traffic rate (e.g., a rate at which M2M gateway 230 may send the M2M traffic to relay network 240) to be applied to the M2M traffic. For example, the parameters may include information associated with determining the outgoing traffic rate (e.g., a link speed, a link speed factor, an effective link speed, etc.), information associated with determining a current traffic rate, a previous average traffic rate, and/or a weighted average traffic rate (e.g., a time window size, a weight constant, etc.), information associated with determining the holding time associated with the M2M traffic (e.g., a buffer size, a buffer size factor, an effective buffer size, etc.), or the like.

As further shown in FIG. 4, process 400 may include determining a weighted average traffic rate based on a current traffic rate, a previous average traffic rate, and the parameters (block 430). For example, M2M gateway 230 may determine a weighted average traffic rate based on a current traffic rate, a previous average traffic rate, and the parameters. In some implementations, M2M gateway 230 may determine the weighted average traffic rate when M2M gateway 230 determines the parameters associated with managing the M2M traffic. Additionally, or alternatively, M2M gateway 230 may determine the weighted average traffic rate when M2M gateway 230 receives the M2M traffic from M2M network 220. Additionally, or alternatively, M2M gateway 230 may determine the weighted average traffic rate when M2M gateway 230 receives, from relay network 240, an indication that M2M gateway 230 is to send M2M traffic to relay network 240.

A weighted average traffic rate may include a traffic rate, associated with a current time window that identifies a weighted average rate of M2M traffic during the current time window and a previous time window. In some implementations, the weighted average traffic rate may be used to determine the holding time and the outgoing traffic rate to be applied to the M2M traffic received by M2M gateway 230. In some implementations, the weighted average traffic rate may be determined based on a time window size, a current traffic rate, a previous average traffic rate, and/or a weight factor.

A time window size may include a length of time, associated with a time window (e.g., a period of time), that M2M gateway 230 may monitor the M2M traffic. For example, M2M gateway 230 may monitor a quantity of data (e.g., a quantity of kilobits, a quantity of megabits, etc.) received during a time window of a particular time window size (e.g., 100 seconds, 5 minutes, etc.) to determine a data rate (e.g., bits per second ("bit/s"), etc.) associated with the time window. In some implementations, M2M gateway 230 may monitor the M2M traffic during multiple (e.g., successive) time windows.

A current traffic rate may include a rate at which M2M traffic is received during a current time window (e.g., the most recent time window). In some implementations, M2M gateway 230 may determine the current traffic rate by dividing a quantity of data, received during the current time window, by the time window size of the current time window.

A previous average traffic rate may include an average traffic rate, associated with one or more previous time windows. For example, the M2M gateway 230 may determine an average traffic rate associated with a first, a second, and a third time window. In this example, the average traffic rate associated with the first, the second, and the third time window may correspond to the previous average traffic rate when M2M gateway 230 is determining an outgoing traffic rate associated with a fourth time window. In some implementations, M2M gateway 230 may determine the previous average traffic rate based on information stored by M2M device 230 (e.g., based on information associated with a previous computation associated with one or more previous time windows). In some implementations, the previous average traffic rate may include a default previous average traffic rate (e.g., where no previous computations, associated with the M2M traffic, have been performed).

In some implementations, the previous average traffic rate, associated with a current time window, may be equal to the weighted average traffic rate associated with a previous time window. For example, M2M gateway 230 may determine a weighted average traffic rate for M2M traffic during a first time window. When M2M gateway 230 is to determine a weighted average traffic rate for M2M traffic during a second time window (e.g., where the second time window immediately follows the first time window), the previous average traffic rate associated with the second time window may be equal to the weighted average traffic rate associated with the first time window.

A weight factor may include a value (e.g., a numerical value), that may be applied to the current traffic rate and/or the previous average traffic rate to indicate the relative importance of the current traffic rate and/or the previous average traffic rate when determining the weighted average traffic rate (e.g., a smaller weight factor may indicate less importance than a higher weight factor).

In some implementations, M2M gateway 230 may determine the weighted average traffic rate by performing a computation associated with the current traffic rate, the previous average traffic rate, and the weight factor. In one example implementation, M2M gateway 230 may determine the weighted average traffic rate in the following manner:
  (1) Multiplying the current traffic rate by the weight factor (e.g., where the weight factor is a numerical value between 0 and 1);
  (2) Multiplying the previous average traffic rate by a value associated with the weight factor (e.g., one minus the weight factor); and
  (3) Summing the results of (1) and (2).

In another example implementation, M2M gateway 230 may determine the weighted average traffic rate using some other function, such as a function that determines the average of the current traffic rate and the previous average traffic rate.

As further shown in FIG. 4, process 400 may include determining a holding time and an outgoing traffic rate based on the weighted average traffic rate and the parameters (block 440). For example, M2M gateway 230 may determine a holding time and an outgoing traffic rate, to be applied to the M2M traffic received from M2M network 220, based on the current weight average traffic rate and the parameters. In some implementations, M2M gateway 230 may determine the holding time and the outgoing traffic rate when M2M gateway 230 determines the weighted average traffic rate. Additionally, or alternatively, M2M gateway 230 may determine the holding time and the outgoing traffic rate when M2M gateway 230 receives the M2M traffic from M2M network 220. Additionally, or alternatively, M2M gateway 230 may determine the holding time and the outgoing traffic rate when M2M gateway 230 receives, from relay network 240, an indication that M2M gateway 230 is to send M2M traffic to relay network 240.

A holding time may include a length of time that M2M gateway 230 may hold (e.g., before sending) the M2M traffic, received by M2M gateway 230 during a time window, after the time window expires. In some implementations, M2M gateway 230 may determine the holding time based on the weighted average traffic rate, the time window size, an effective link speed, and/or an effective buffer size.

An effective link speed may include a maximum outgoing traffic rate that M2M gateway 230 may send the M2M traffic to relay network 240. In some implementations, the effective link speed and/or information associated with the effective link speed (e.g., a maximum link speed, a link speed factor) may be included in the parameters. In some implementations, M2M gateway 230 may determine the effective link speed based on the maximum link speed and the link speed factor (e.g., a numerical value between 0 and 1). For example, M2M gateway 230 may determine the effective link speed by multiplying the maximum link speed by the link speed factor.

An effective buffer size may include a maximum quantity of memory that M2M gateway 230 may use to hold the M2M traffic before sending the M2M traffic to relay network 240. In some implementations, the effective buffer size and/or information associated with the effective buffer size (e.g., a maximum buffer size, a buffer size factor) may be included in the parameters. In some implementations, M2M gateway 230 may determine the effective buffer size based on the maximum buffer size and the buffer size factor (e.g., a numerical value between 0 and 1). For example, M2M gateway 230 may determine the effective buffer size by multiplying the maximum buffer size by the buffer size factor.

In some implementations, M2M gateway 230 may determine the holding time by performing a computation associated with the effective link speed, the time window size, the effective buffer size, and/or the weighted average traffic rate. In one example implementation, M2M gateway 230 may determine the holding time in the following manner:
  (1) Multiplying the effective link speed by the time window size;
  (2) Adding the effective buffer size to the result of (1); and
  (3) Dividing the result of (2) by the weighted average traffic rate.

An outgoing traffic rate may include a rate at which M2M gateway 230 may release the M2M traffic after the holding time has passed. In some implementations, M2M gateway 230 may determine the outgoing traffic rate based on comparing the weighted average traffic rate and the effective link speed. For example, M2M gateway 230 may determine that if the weighted average traffic rate is less than the effective link speed, then the outgoing traffic rate is to be equal to the weighted average traffic rate. As an additional example, M2M gateway 230 may determine that if the weighted average traffic rate is greater than or equal to the effective link speed, then the outgoing traffic rate is to be equal to the effective link speed.

As further shown in FIG. 4, process 400 may include managing the M2M traffic based on the holding time and the outgoing traffic rate (block 450). For example, M2M gateway 230 may manage the M2M traffic, received from M2M network 220, based on the holding time and the outgoing traffic rate determined by M2M gateway 230. In some implementations, M2M gateway 230 may manage the M2M traffic when M2M gateway 230 determines the holding time and/or the outgoing traffic rate. Additionally, or alternatively, M2M gateway 230 may manage the M2M traffic when M2M gateway 230 receives, from relay network 240, an indication that M2M gateway 230 is to send the M2M traffic to relay network 240.

Managing the M2M traffic may include holding the M2M traffic (e.g., in accordance with the holding time), and/or releasing the M2M traffic (e.g., at the outgoing traffic rate). For example, M2M gateway 230 may determine the holding time and the outgoing traffic rate, associated with the M2M traffic, and may hold the M2M traffic (e.g., prevent the M2M traffic from being sent to relay network 240) for a length of time equal to the holding time. M2M gateway 230 may release the M2M traffic (e.g., send the M2M traffic to relay network 240) at a data rate equal to the outgoing traffic rate when the holding time has passed.

As further shown in FIG. 4, process 400 may include determining whether the parameters are to be adjusted (block 460). For example, M2M gateway 230 may determine whether the parameters are to be adjusted. In some implementations, M2M gateway 230 may determine whether the parameters are to be adjusted when M2M gateway 230 determines the holding time and/or the outgoing traffic rate.

In some implementations, M2M gateway 230 may determine whether the parameters are to be adjusted based on the holding time and/or the outgoing traffic rate. For example, M2M gateway 230 may determine that the holding time and/or the outgoing traffic rate (e.g., computed by M2M gateway 230) satisfy a threshold (e.g., where the parameters are to be adjusted when the threshold is satisfied). Additionally, or alternatively, M2M gateway 230 may determine that the parameters are to be adjusted based on information received from relay network 240 (e.g., where relay network 240 provides information indicating the parameters are to be adjusted). Additionally, or alternatively, M2M gateway 230 may determine whether the parameters are to be adjusted based on information stored by M2M gateway 230. In some implementations, M2M gateway 230 may store information indicating that the parameters are to be adjusted based on a particular time (e.g., a periodic adjustment, a particular time of day, etc.), a particular condition associated with the M2M traffic (e.g., a peak traffic rate, a threshold quantity of data is received, etc.), or the like.

As further shown in FIG. 4, if the parameters are to be adjusted (block 460—YES), then process 400 may return to block 420. For example, M2M gateway 230 may determine that the parameters are to be adjusted, and M2M gateway 230 may determine the adjusted parameters, associated with the M2M traffic, as discussed above.

As further shown in FIG. 4, if the parameters are not to be adjusted (block 460—NO), then process 400 may return to block 430. For example, M2M gateway 230 may determine that the parameters are not to be adjusted, and M2M gateway 230 may determine a weighted average traffic rate (e.g., for a next time window), as discussed above.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

FIGS. 5A-5D are diagrams of an example implementation 500 relating to example process 400 shown in FIG. 4. For the purposes of example implementation 500, assume that eCare is an M2M application, and that a number of M2M devices, identified as M001 through M500, are included in an eCare network associated with the eCare application. Further, assume that one or more devices of M001 through M500 are attempting to send M2M traffic, associated with the eCare M2M application, to an eCare application server (e.g., via relay network 240), and that the eCare traffic is sent in an unpredictable manner.

Figure 5A:
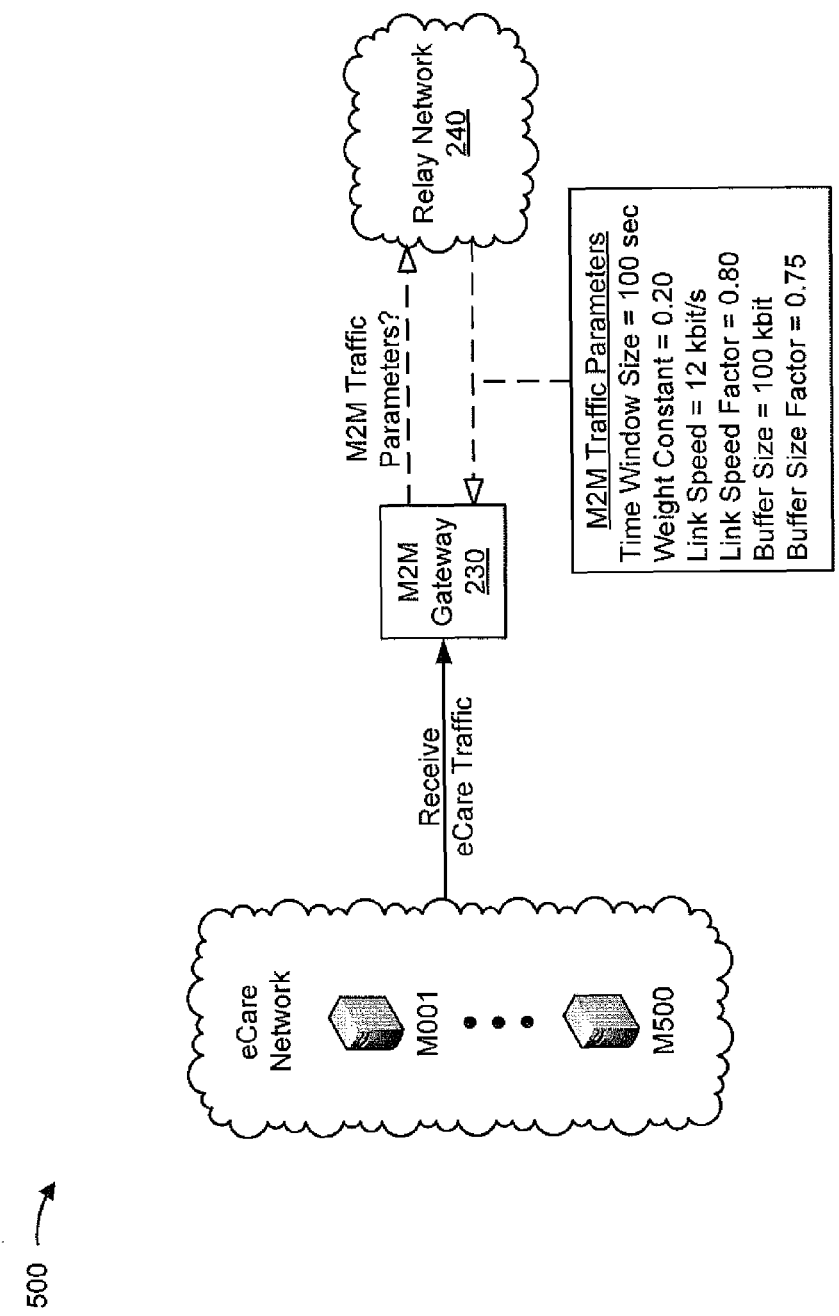
FIG. 5A-5D are diagrams of an example implementation relating to the example process shown in FIG. 4.

As shown in FIG. 5A, the one more devices of M001 through M500 may send eCare traffic, via the eCare network, to M2M gateway 230. As shown, M2M gateway 230 may receive the eCare traffic, and may determine that the eCare traffic is associated with an M2M application. As further shown, M2M gateway 230 may query relay network 240 to determine M2M traffic parameters that are to be applied to the eCare traffic. As shown, relay network 240 may send the M2M traffic parameters (e.g., stored by a device included in relay network 240) to M2M gateway 230. As shown, the M2M traffic parameters may indicate a time window size of 100 seconds ("sec"), a weight constant of 0.20, a link speed of 12 kilobits per second ("kbit/s"), a link speed factor of 0.80, a buffer size of 100 kilobits ("kbit"), and a buffer size factor of 0.75.

Figure 5B:
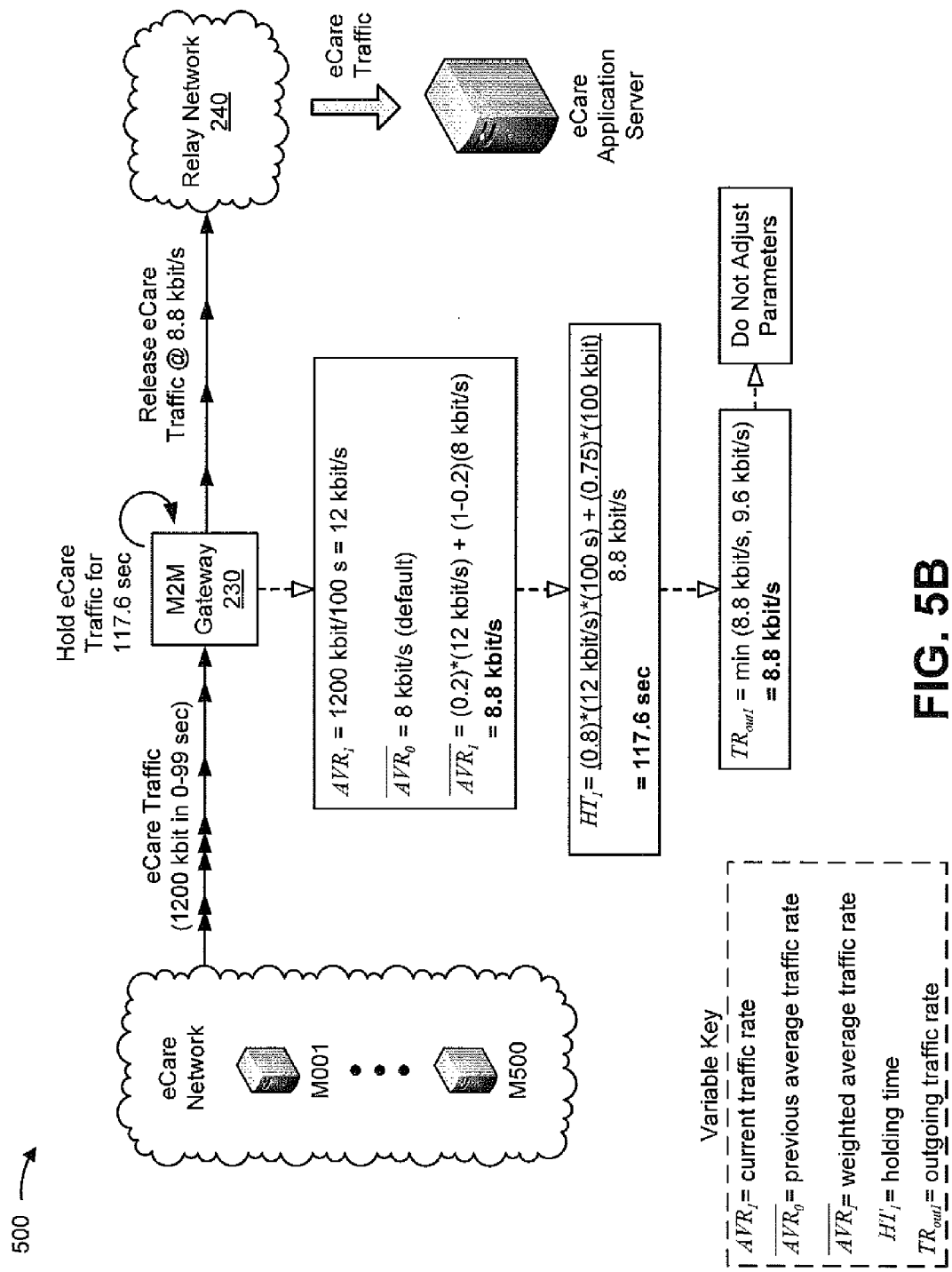

For the purposes of FIG. 5B, assume that M2M gateway 230 stores information indicating that a default previous average traffic rate of 8 kbit/s is to be used to determine the holding time and the outgoing traffic rate of the eCare traffic (e.g., since M2M gateway 230 is determining the holding time and the outgoing traffic rate for a first time window after M2M gateway 230 begins receiving eCare traffic).

As shown in FIG. 5B, M2M gateway 230 may receive 1200 kbits of data during the first 100 second time window (e.g., measured from when M2M gateway 230 begins receiving the eCare traffic). As further shown, M2M gateway 230 may determine the current traffic rate based on the 1200 kbits of data and the 100 second time window. As shown, M2M gateway 230 may determine that the current traffic rate is 12 kbit/s (e.g., 1200 kbit/100 s=12 kbit/s).

As further shown, M2M gateway 230 may determine the weighted average traffic rate based on the current traffic rate (e.g., 12 kbit/s), the previous average traffic rate (e.g., 8 kbit/s), and the weight factor (e.g., 0.20). As shown, M2M gateway 230 may determine that the weighted average traffic rate is 8.8 kbit/s (e.g., (0.2×12 kbit/s)+((1−0.2)×8 kbit/s) =8.8 kbit/s).

As further shown in FIG. 5B, M2M gateway 230 may determine the holding time for the eCare traffic received during the first time window. As shown, M2M gateway 230 may determine the holding time based on the link speed factor (e.g., 0.80), the link speed (e.g., 12 kbit/s), the time window size (e.g., 100 sec), the buffer size factor (e.g., 0.75), the buffer size (e.g, 100 kbit), and the weighted average traffic rate (e.g., 8.8 kbit/s). As shown, M2M gateway 230 may determine that the holding time for the eCare traffic received during the first time window is 117.6 seconds (e.g., [(0.8×12 kbit/s×100 s)+(0.75×100 kbit)]/8.8 kbit/s=117.6 sec).

As further shown, M2M gateway 230 may determine the outgoing traffic rate for the eCare traffic received during the first time window. As shown, M2M gateway 230 may determine the outgoing traffic rate based on the minimum of the weighted average traffic rate (e.g., 8.8 kbit/s) and the effective link speed (e.g., 0.8×12 kbit/s=9.6 kbit/s). As shown, M2M gateway 230 may determine that the outgoing traffic rate for the eCare traffic received during the first time window is 8.8 kbit/s (e.g., since 8.8 kbit/s is less than 9.6 kbit/s).

As further shown in FIG. 5B, M2M gateway 230 may determine that the parameters are not to be adjusted (e.g., since the weighted average traffic rate, determined by M2M gateway 230, does not exceed the effective link speed), and may continue managing the eCare traffic in a in a second time window (e.g., using the same parameters that were used to manage the M2M traffic received during the first time window). As shown, M2M gateway 230 may also hold the eCare traffic for 117.6 seconds after the end of the first time window. M2M gateway 230 may then release the eCare traffic to relay network 240 at a rate of 8.8 kbit/s, and relay network 240 may forward the eCare traffic to the eCare application server, as shown.

Figure 5C:
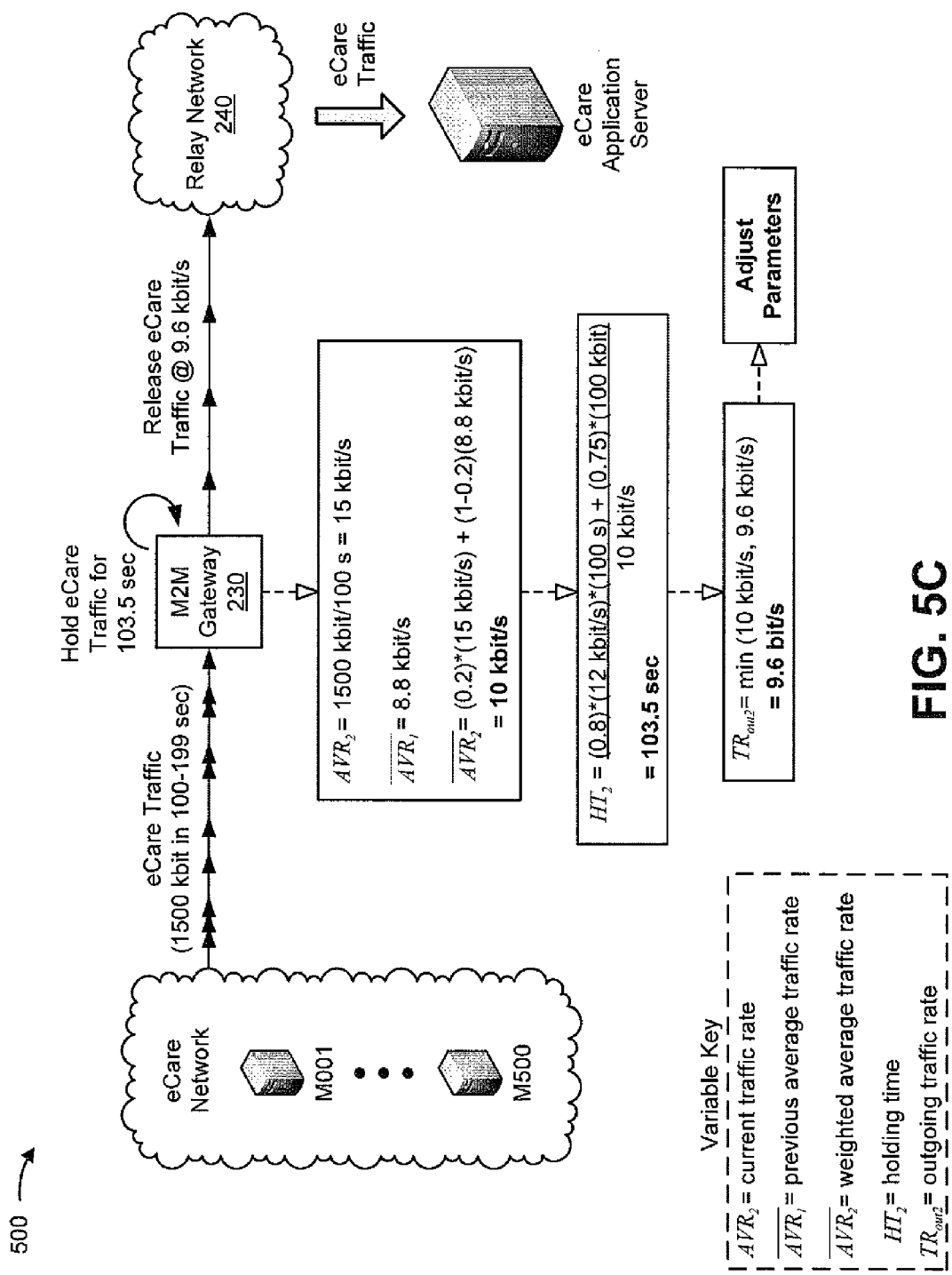

For the purposes of FIG. 5C, assume that M2M gateway 230 continues receiving eCare traffic (e.g., in a unpredictable manner) through a second time window (e.g., 100 to 199 seconds). Further assume that the second time window begins immediately after the first time window (e.g., M2M gateway 230 may be holding the eCare traffic, received in the first time window, during the second time window).

As shown in FIG. 5C, M2M gateway 230 may receive 1500 kbits of data during the second 100 second time window (e.g., from 100 to 199 seconds). As further shown, M2M gateway 230 may determine the current traffic rate based on the 1500 kbits of data and the 100 second time window. As shown, M2M gateway 230 may determine that the current traffic rate is 15 kbit/s (e.g., 1500 kbit/100 s=15 kbit/s).

As further shown, M2M gateway 230 may determine the weighted average traffic rate based on the current traffic rate (e.g., 15 kbit/s), the previous average traffic rate (e.g., 8.8 kbit/s, as determined for the first time window in FIG. 5B), and the weight factor (e.g., 0.20). As shown, M2M gateway 230 may determine that the weighted average traffic rate is 10 kbit/s (e.g., (0.2×15 kbit/s)+((1−0.2)×8.8 kbit/s)=10 kbit/s).

As further shown in FIG. 5C, M2M gateway 230 may determine the holding time for the eCare traffic received during the second time window. As shown, M2M gateway 230 may determine the holding time based on the link speed factor (e.g., 0.80), the link speed (e.g., 12 kbit/s), the time window size (e.g., 100 sec), the buffer size factor (e.g., 0.75), the buffer size (e.g, 100 kbit), and the weighted average traffic rate (e.g., 10 kbit/s). As shown, M2M gateway 230 may determine that the holding time for the eCare traffic received during the second time window is 103.5 seconds (e.g., [(0.8×12 kbit/s×100 s)+(0.75×100 kbit)]/10 kbit/s=103.5 sec).

As further shown, M2M gateway 230 may determine the outgoing traffic rate for the eCare traffic received during the second time window. As shown, M2M gateway 230 may determine the outgoing traffic rate based on the minimum of the weighted average traffic rate (e.g., 10 kbit/s) and the effective link speed (e.g., 9.6 kbit/s). As shown, M2M gateway 230 may determine that the outgoing traffic rate for the eCare traffic received during the second time window is 9.6 kbit/s (e.g., since 9.6 kbit/s is less than 10 kbit/s).

As further shown in FIG. 5C, M2M gateway 230 may determine that the parameters are to be adjusted (e.g., since the weighted average traffic rate, determined by M2M gateway 230, exceeds the effective link speed). As shown, M2M gateway 230 may also hold the eCare traffic for 103.5 seconds after the end of the second time window. M2M gateway 230 may then release the eCare traffic to relay network 240 at a rate of 9.6 kbit/s, and relay network 240 may forward the eCare traffic to the eCare application server.

Figure 5D:
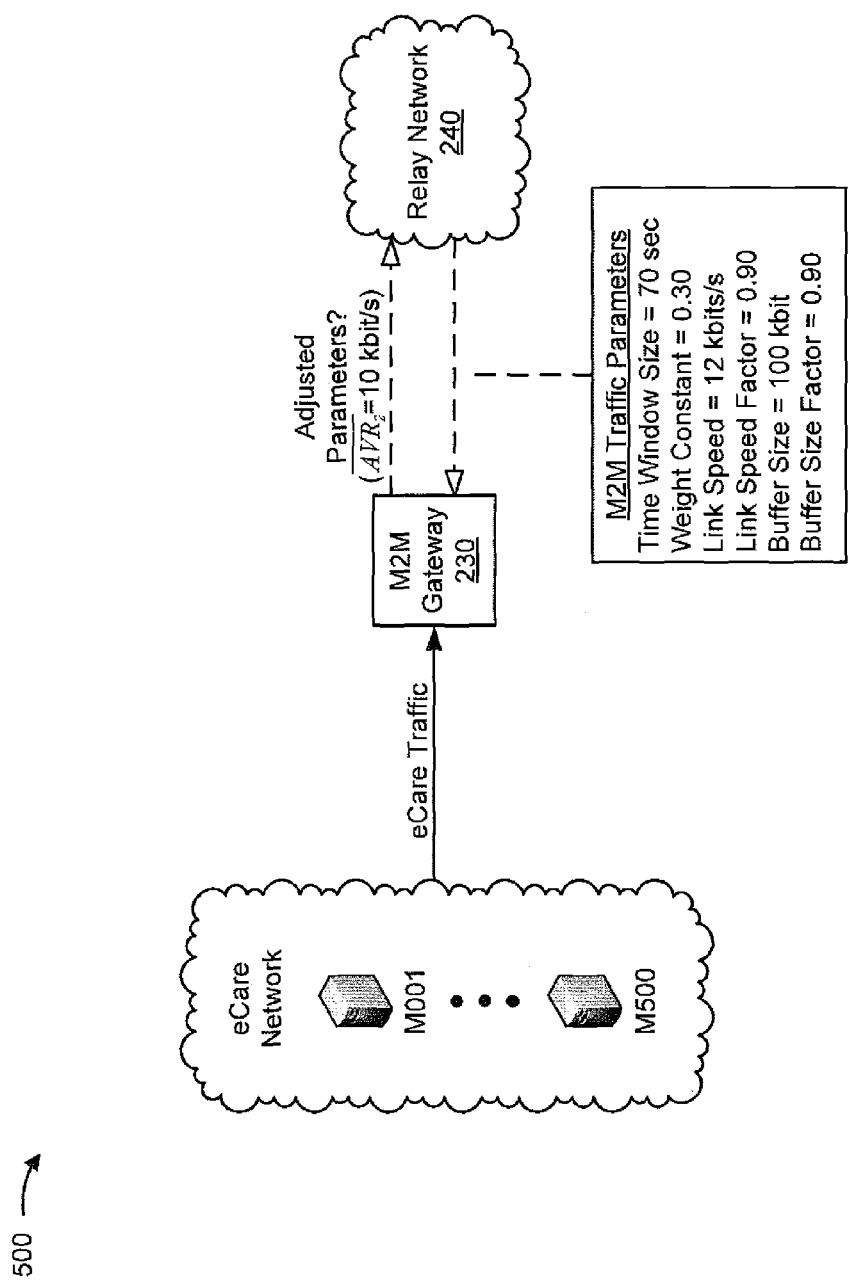

As shown in FIG. 5D, M2M gateway 230 may continue to receive eCare traffic, and M2M gateway 230 may determine adjusted parameters associated with determining a holding time and an outgoing traffic rate for a next (e.g., third) time window. As shown, M2M gateway 230 may query relay network 240 to determine adjusted M2M traffic parameters that are to be applied to the eCare traffic (e.g., based on the weighted average traffic rate of 10 kbit/s). As shown, relay network 240 may send the adjusted M2M traffic parameters (e.g., stored by a device included in relay network 240) to M2M gateway 230. As shown, the M2M traffic parameters may indicate a time window size of 70 seconds, a weight constant of 0.30, a link speed of 12 kbit/s, a link speed factor of 0.90, a buffer size of 100 kbit, and a buffer size factor of 0.90. M2M gateway 230 may continue monitoring the eCare traffic in real-time, may continue determining a holding time and an outgoing traffic rate for each successive time window, and may continue managing the eCare traffic in this manner.

As indicated above, FIGS. 5A-5D are provided merely as an example. Other examples are possible and may differ from what was described with regard to FIGS. 5A-5D.

Implementations described herein may allow M2M traffic to be managed, in real-time, in a way that may result in the M2M traffic using network resources in a steady and/or predictable manner, which may allow a network, associated with handling the M2M traffic, to be efficiently managed and/or dimensioned.

The foregoing disclosure provides illustration and description, but is not intended to be exhaustive or to limit the implementations to the precise form disclosed. Modifications and variations are possible in light of the above disclosure or may be acquired from practice of the implementations. While the implementations described herein discuss M2M communication specifically, these implementations may also be applied to another type of communication with the same or similar characteristics of M2M communication.

As used herein, the term component is intended to be broadly construed as hardware, firmware, or a combination of hardware and software.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
receive, from a plurality of machine-to-machine (M2M) devices, M2M traffic to be provided to an M2M application server,
the M2M traffic being randomly received from each of the plurality of M2M devices over a time window;
determine parameters associated with managing the M2M traffic,
the parameters including information identifying the time window, a maximum outgoing traffic rate associated with the device, and a maximum quantity of memory associated with the device;
determine a weighted average traffic rate associated with the M2M traffic,
the weighted average traffic rate being determined based on the parameters;
determine a holding time to be applied to the M2M traffic,
the holding time including a length of time that the device stores the M2M traffic after the time window expires and before providing the M2M traffic to the M2M application server,
the holding time being determined based on the weighted average traffic rate and the parameters;
determine an outgoing traffic rate to be applied to the M2M traffic,
the outgoing traffic rate being determined based on the weighted average traffic rate and the parameters; and
provide the M2M traffic to the M2M application server based on the holding time and the outgoing traffic rate.

2. The device of claim 1, where the one or more processors are further to:
monitor a quantity of M2M data, associated with M2M traffic, received during a period of time equal to the time window.

3. The device of claim 1, where the one or more processors are further to:
determine a current traffic rate based on the M2M traffic and the information identifying the time window; and
determine a previous average traffic rate; and
where the one or more processors, when determining the weighted average traffic rate, are to:
determine the weighted average traffic rate based on the current traffic rate and the previous average traffic rate.

4. The device of claim 1, where the one or more processors are further to:
determine that the weighted average traffic rate does not exceed an effective link speed associated with a network; and
where the one or more processors, when determining the outgoing traffic rate, are to:
determine the outgoing traffic rate based on the weighted average traffic rate not exceeding the effective link speed associated with the network.

5. The device of claim 1, where the one or more processors are further to:
hold the M2M traffic for a period of time equal to the holding time; and
release the M2M traffic at a rate equal to the outgoing traffic rate after the holding time.

6. The device of claim 1, where the one or more processors are further to:
determine that the parameters are to be adjusted based on the outgoing traffic rate; and
determine information identifying adjusted parameters based on determining that the parameters are to be adjusted.

7. The device of claim 1, where:
the holding time is a first holding time, the outgoing traffic rate is a first outgoing traffic rate, and the time window is a first time window; and
where the one or more processors are further to:
determine a second holding time and a second outgoing traffic rate associated with a second time window; and
provide the M2M traffic to the M2M application server based on the second holding time and the second outgoing traffic rate.

8. A non-transitory computer-readable medium storing instructions, the instructions comprising:
one or more instructions that, when executed by one or more processors, cause the one or more processors to:
receive, from a plurality of machine-to-machine (M2M) devices, M2M traffic associated with to be provided to an M2M application server,
the M2M traffic being randomly received from each of the plurality of M2M devices over a time window;
determine parameters associated with managing the M2M traffic,
the parameters including information identifying the time window, a maximum outgoing traffic rate, and a maximum quantity of memory;
compute, based on the parameters, a weighted average traffic rate associated with the M2M traffic;
compute, based on the weighted average traffic rate and the parameters, a holding period to be applied to the M2M traffic;

the holding period including a length of time to store the M2M traffic after the time window expires and before providing the M2M traffic to the M2M application server,
determine an outgoing traffic rate to be applied to the M2M traffic,
the outgoing traffic rate being determined based on the weighted average traffic rate and the parameters; and
provide the M2M traffic to the M2M application server based on the holding period and the outgoing traffic rate.

9. The non-transitory computer-readable medium of claim 8, where the one or more instructions, when executed by the one or more processors, further cause the one or more processors to:
determine a quantity of data, associated with traffic, received during a period of time equal to the time window.

10. The non-transitory computer-readable medium of claim 8, where the one or more instructions, when executed by the one or more processors, further cause the one or more processors to:
determine a current traffic rate based on the M2M traffic and the information identifying the time window;
determine a previous average traffic rate; and
compute the weighted average traffic rate based on the current traffic rate and the previous average traffic rate.

11. The non-transitory computer-readable medium of claim 8, where the one or more instructions, when executed by the one or more processors, further cause the one or more processors to:
determine that the weighted average traffic rate exceeds an effective link speed associated with a relay network; and
determine the outgoing traffic rate based on the weighted average traffic rate exceeding the effective link speed associated with the relay network.

12. The non-transitory computer-readable medium of claim 8, where the one or more instructions, when executed by the one or more processors, further cause the one or more processors to:
hold the M2M traffic for a period of time equal to the holding period; and
release the M2M traffic at a rate equal to the outgoing traffic rate after the holding period.

13. The non-transitory computer-readable medium of claim 8, where the one or more instructions, when executed by the one or more processors, further cause the one or more processors to:
determine that the parameters are to be adjusted based on the holding period; and
determine information identifying adjusted parameters based on determining that the parameters are to be adjusted,
the information identifying the adjusted parameters being used to compute another holding period.

14. The non-transitory computer-readable medium of claim 8, where:
the holding period is a first holding period, the outgoing traffic rate is a first outgoing traffic rate, and the time window is a first time window; and
where the one or more instructions, when executed by the one or more processors, further cause the one or more processors to:
compute a second holding period associated with a second time window;
determine a second outgoing traffic rate associated with the second time window; and
manage the M2M traffic based on the second holding period and the second outgoing traffic rate.

15. A method, comprising:
receiving, by a device and from a plurality of machine-to-machine (M2M) devices, M2M traffic to be provided to an M2M application server,
the M2M traffic being randomly received from each of the plurality of M2M devices over a time window;
identifying, by the device, parameters associated with managing the M2M traffic,
the parameters including information identifying the time window, a maximum outgoing traffic rate associated with the device, and a maximum quantity of memory associated with the device;
determining, by the device, a weighted average traffic rate associated with the M2M traffic based on the parameters;
calculating, by the device, a holding time to be applied to the M2M traffic based on the weighted average traffic rate and the parameters,
the holding time including a length of time that the device stores the M2M traffic after the time window expires and before providing the M2M traffic to the M2M application server;
determining, by the device, an outgoing traffic rate to be applied to the M2M traffic,
the outgoing traffic rate being determined based on the weighted average traffic rate and the parameters; and
providing, by the device, the M2M traffic to the M2M application server based on the holding time and the outgoing traffic rate.

16. The method of claim 15, further comprising:
determining a current traffic rate based on the M2M traffic and the information identifying the time window;
determining a previous average traffic rate; and
determining the weighted average traffic rate based on the current traffic rate and the previous average traffic rate.

17. The method of claim 15, further comprising:
determining that the weighted average traffic rate does not exceed an effective link speed associated with a network; and
determining the outgoing traffic rate based on determining that the weighted average traffic rate does not exceed the effective link speed associated with the network.

18. The method of claim 15, further comprising:
holding the M2M traffic for a period of time equal to the holding time; and
releasing the M2M traffic at a rate equal to the outgoing traffic rate after the holding time.

19. The method of claim 15, further comprising:
determining that the parameters are to be adjusted based on the outgoing traffic rate; and
determining information identifying adjusted parameters based on determining that the parameters are to be adjusted,
the information identifying the adjusted parameters being used to determine the outgoing traffic rate.

20. The method of claim 15, where:
the holding time is a first holding time, the outgoing traffic rate is a first outgoing traffic rate, and the time window is a first time window; and
where the method further comprises:
calculating a second holding time associated with a second time window;

determining a second outgoing traffic rate associated with the second time window; and providing the M2M traffic to the M2M application server based on the second holding time and the second outgoing traffic rate.

* * * * *